United States Patent [19]

Austin et al.

[11] Patent Number: 4,507,783

[45] Date of Patent: Mar. 26, 1985

[54] ERROR DETECTION CIRCUITRY FOR DIGITAL SYSTEMS

[75] Inventors: Stewart S. Austin, Morganville; Joseph J. Baldini, III, Lincroft; Joel E. Jakubson, Neptune; Clarke S. Ryan, Red Bank, all of N.J.

[73] Assignee: AT&T Bell Laboratories, Murray Hill, N.J.

[21] Appl. No.: 470,148

[22] Filed: Feb. 28, 1983

[51] Int. Cl.³ .............................................. G06F 11/10
[52] U.S. Cl. ..................................................... 371/49
[58] Field of Search ......................... 371/49, 47, 51, 50

[56] References Cited

U.S. PATENT DOCUMENTS

| | | | |
|---|---|---|---|
| 3,234,510 | 2/1966 | Scott | 371/49 |
| 3,404,372 | 10/1968 | Robbins | 371/49 |
| 3,820,083 | 6/1974 | Way | 371/49 |
| 4,121,195 | 10/1978 | Jessop | 340/146.1 |
| 4,412,329 | 10/1983 | Yarborough, Jr. | 371/47 |
| 4,425,645 | 1/1984 | Weaver et al. | 371/47 |

OTHER PUBLICATIONS

D. R. Hill, "140 Mb/s Optical Fiber Field Demonstration System", *Electrical Communication*, vol. 54, No. 1, Nov. 1, 1979.

*Primary Examiner*—Charles E. Atkinson
*Attorney, Agent, or Firm*—David R. Padnes

[57] ABSTRACT

Circuitry for detecting errors in a digital bit stream comprising a succession of data blocks and wherein each data block incorporates a parity check. At an error monitoring location, a bistable device toggles in response to either a logical "1" or "0" in the bit stream. The output of the bistable device is sampled at a sub-multiple of the bit rate and compared with a predetermined criterion to detect bit errors.

10 Claims, 2 Drawing Figures

4,507,783

ERROR DETECTION CIRCUITRY FOR DIGITAL SYSTEMS

TECHNICAL FIELD

The present invention relates to an error detection circuit and more particularly to circuitry for detecting errors in a digital bit stream incorporating a parity check.

BACKGROUND OF THE INVENTION

A common technique for detecting errors in digital transmission systems is to use a parity check. Pursuant to this scheme, the data bits at the transmitter are divided into sections or blocks with each block having at least one parity bit. Within each block, the value of the parity bit is selected to make the number of 1's (or 0's) odd or even. The latter is referred to as even parity and the former is referred to as odd parity. Of course, the parities of a series of blocks can be either all odd, all even, or a combination thereof. At the receiver, the parity of each block is calculated and compared with the information carried by each received parity bit to confirm whether or not a bit error has occurred.

The parity calculation for each block is a relatively straightforward matter once the individual data blocks are identified. The identification of data blocks can be a more difficult task, especially in system applications where the data transmission is continuous and error detection circuitry capable of relocating the blocks after a period of garbled transmission is desired. To provide this capability, an easily identifiable pattern of bits in a fixed position relative to the data blocks is added to the bit stream. For example, in systems transmitting a time division multiplexed signal, the data blocks are typically located after first locating the recurring framing bit pattern. While this technique works satisfactorily, identifying the data blocks by first locating the framing bit pattern is inherently a two-step process. However, the cost, required power and physical size of the resulting error detection circuit does not meet the desired objectives of many system applications. This is particularly true where the error detection capability is desired at a digital signal regenerator. Regenerators do not normally require framing recovery circuitry and the available space and power are often limited.

A prior art approach to provide error detection without the need for elaborate data block identification circuitry is to utilize digital signal format having constant accumulated disparity (see, for example, U.S. Pat. No. 4,121,195 to Jessup issued Oct. 17, 1978). The term "constant accumulated disparity" means that over a sufficient period of time the ratio of logical 1's to 0's (or vice versa) is substantially constant. As a result, the presence of bit errors can be monitored by detecting changes in the averaged dc output of a bistable device which toggles on a predetermined bit value. The shortcomings of this method are that either expensive comparators are required to detect subtle dc changes or the size of each data block and, hence, the spacing between parity bits, must be kept small. The former is obviously undesirable from a cost standpoint while the latter decreases the signal transmission efficiency.

SUMMARY OF THE INVENTION

The present invention addresses the problem of detecting errors in a digital bit stream comprising a succession of data blocks which incorporate a parity check. In accordance with the present invention, a bistable device at an error monitoring location monitors the incoming bit stream and toggles in response to the occurrence of a predetermined bit value. The output of the bistable device is sampled at a submultiple of the bit rate and the presence of errors is determined by examining the sampled bistable device output. This technique is particularly advantageous as it can be readily used to provide in-service error monitoring of high speed digital transmission systems without significantly reducing the signal transmission efficiency.

DETAILED DESCRIPTION

Figure 1:
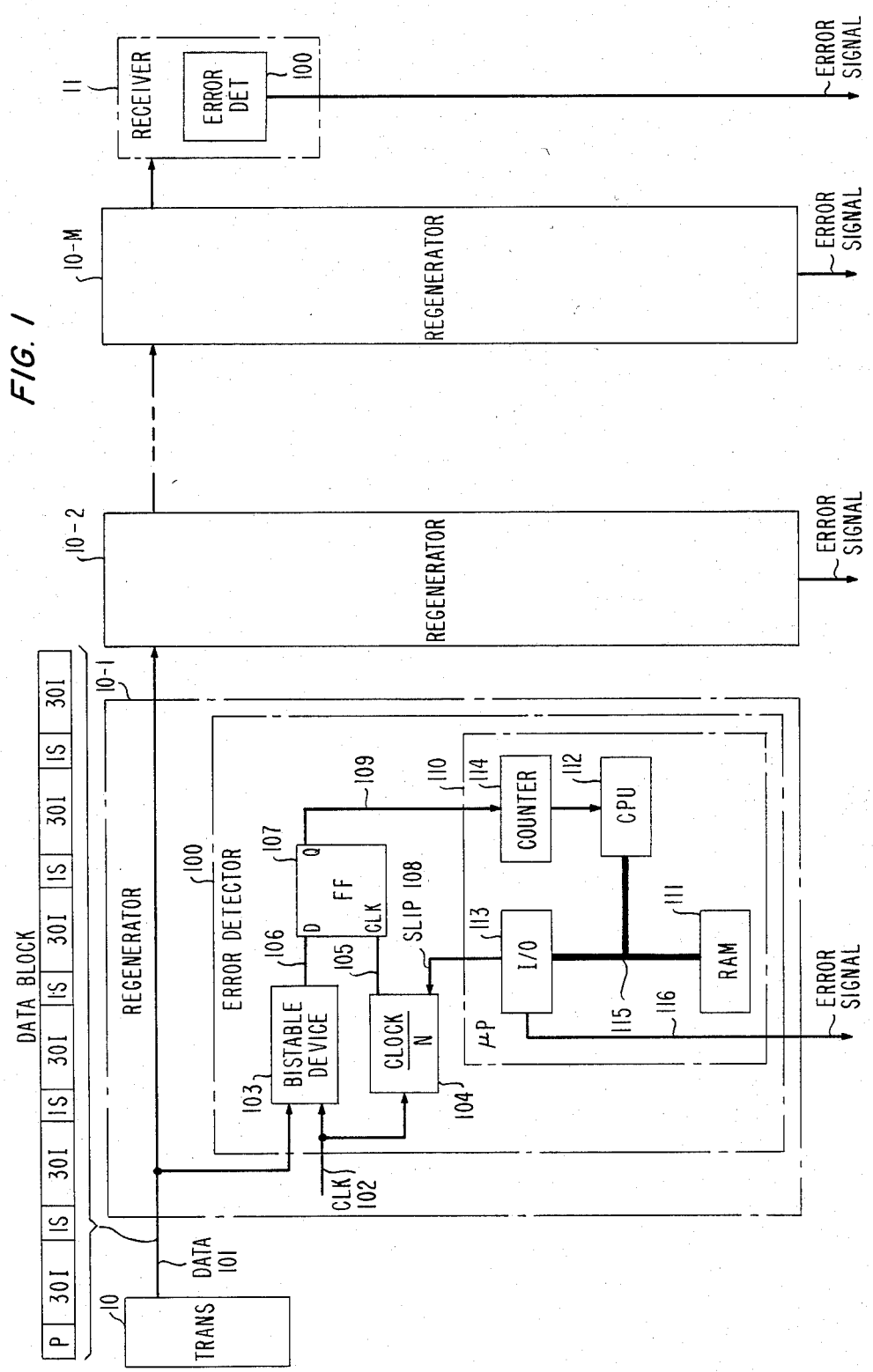
FIG. 1 is a schematic block diagram of an embodiment of the present invention within a digital communications system.

FIG. 1 shows an error detection circuit, in accordance with the present invention, disposed within a digital communications system which transmits a time division multiplexed signal from transmitter 10 to receiver 11 via path 101. As illustrated, error detector circuit 100 is disposed within regenerator 10-1 to provide in-service error monitoring of the synchronous bit stream which has a bit rate of approximately 144 megabits/sec. Regenerators 10-2 through 10-M and receiver 11, shown only in block form for purposes of clarity, each incorporate an error detector circuit 100.

At the transmitter, the data bits to be transmitted are partitioned into contiguous data blocks of equal size and a parity bit, P, is appended to each block to set the number of logical 1's to an even integer. The number of bits in the data block inclusive of the parity bit can be any integer and will hereinafter be referred to as N. One such data block is illustrated in FIG. 1. The data block comprises six groups of thirty information ("I") bits interleaved with five single signal ("S") bits. The parity or P bit is appended at the end of the block, i.e., it is the last transmitted bit in each block. In the illustrated format, N=186.

Error detector 100 comprises a bistable device 103 which is connected to path 101. Device 103 switches from one output state to the other in synchronism with the line clock CLK, in response to each logical "1" occurrence on path 101. Signal CLK, supplied to device 103 via lead 102, can be extracted from the bit stream on path 101 using conventional clock recovery circuitry (not shown) in each regenerator.

Clock divider circuit 104 divides signal CLK by N. D-type flip-flop 107, clocked by CLK/N via lead 105, samples the output state of device 103 appearing on lead 107 once every N CLK pulses and gates this state to the Q output and lead 109. Microprocessor 110 examines the state of lead 109 and determines therefrom the presence or absence of errors in the bit stream transmitted on path 101.

To understand the operation of microprocessor 110, it should be noted that if each data block has even parity and flip-flop 107 is clocked at the P bit time, i.e., immediately after bistable device 103 receives the P bit, the state of lead 109 remains constant in the absence of bit errors. The same result also occurs if there is an even number of bit errors in any of the data blocks. If, on the other hand, an odd number of bit errors is present in any of the data blocks, the state of lead 109 will change when flip-flop 107 is clocked at the P bit time. Accordingly, microprocessor 110 examines lead 109 for state, i.e., logic level transitions. If a predetermined number of logic level transitions in a specified time interval is not found, microprocessor 110 assumes that flip-flop 107 is being clocked at the P bit time and continues the examination of lead 109. If, however, the predetermined number of logic level transitions occur on lead 109 within the specified time interval, this assumption is deemed incorrect and microprocessor 110 inhibits clock divider circuit 104 for one bit period via a slip signal on lead 108. This inhibiting of circuit 104 slips the sampling of the output of bistable device 103 by one bit period. The examination of lead 109 then begins again with the same slipping of CLK/N by one bit period if the predetermined number of logic level transitions within the specified time interval occurs on lead 109. Finally, should the predetermined number of logic level transitions persist after slipping CLK/N by at least N bit periods, an error signal is generated on lead 116. This error signal along with corresponding signals from other error detection circuits can be supplied to a cenral location for remote error monitoring.

Microprocessor 110 comprises a counter 114, which counts the logic level transitions on lead 109, a central processing unit (CPU) 112, a random access memory (RAM) and an input/output (I/O) unit 113. CPU 112, RAM 111 and I/O unit 113 are connected to one another by means of bus 115.

Figure 2:
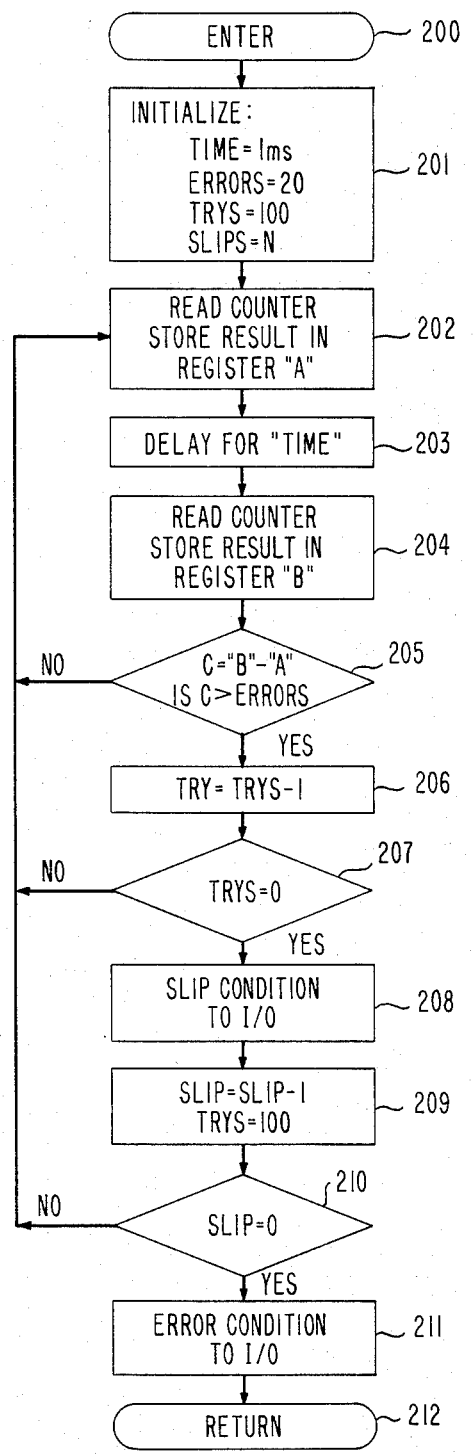
FIG. 2 is a flow chart of the operation of the microprocessor shown in FIG. 1.

Refer now to FIG. 2 which describes the operation of microprocessor 110 in flow chart form. The illustrated flow chart includes three different symbols. The oval symbols indicate the entering and exiting of the program routine. The rectangular symbols commonly referred to as operation blocks contain the description of a particular operational step to be performed. Finally, the diamond symbols, typically referred to as conditional branch points, contain a description of a test performed by the microprocessor for enabling it to determine the next operational step to be performed.

As shown in the flow chart of FIG. 2, the routine for examining the sampled bistable device output is entered at oval 200. Operational block 201 causes the parameters TIME to be set to 1 millisecond; ERRORS to be set to 20; TRYS to be set to 100; and SLIPS to be set to N or 186. After this initialization, as shown in operational block 202, CPU 112 reads the count of counter 114 and stores the result in location A of RAM 111. After a delay of TIME, or 1 millisecond, as indicated by operational block 203, the count of counter 144 is read again and the results stored in RAM location B. This second reading and storing of the count of counter 114 is shown in operational block 204.

Conditional branch point 205 illustrates the comparison of the contents within RAM locations A and B. If the difference of B−A is less than 20, the routine returns to operational box 202. If this difference is greater than 20, the routine proceeds to operational block 206 and the parameter TRY is decremented by 1, as indicated within operational box 206.

Conditional branch point 207 follows the operation shown in block 206. If parameter TRYS is unequal to 0, the routine returns to operational block 202 while, if the parameter TRYS equals 0, the routine proceeds to operational block 208. At block 208, CPU 112 directs I/O unit 113 via bus 115 to generate a slip signal on lead 108. This slip signal inhibits clock divider circuit 104 for one bit period.

Operational box 209 indicates that once a slip signal is sent parameter slip is decremented by 1 and the parameter TRYS is reset to 100. The routine, as indicated by conditional branch point 210, returns to operational block 202 if parameter slip is unequal to 0 or proceeds to operational block 211 wherein CPU 112 directs I/O unit 113 to generate an error signal on lead 116. After this error signal is generated, the routine returns to oval 200 as indicated by oval 212.

The error signal generated by I/O unit 113 advantageously persists for a predetermined time interval and then times out. This predetermined time interval is generally set to be not less than the time it takes the subroutine to go from oval 200 to box 211 assuming that parameter ERRORS is greater than 20 for 100 TRYS times N. Accordingly, once satisfactory signal transmission is restored, the error signal is automatically extinguished. The above-described operations in operational blocks 201 through 204, when applied to the disclosed digital system transmitting a 144 megabit/sec. bit stream partitioned into 186 bit contiguous data blocks, are equivalent to examining the number of logic level transitions on lead 109 over approximately 770 data blocks. If 20 such transitions occur and persist for at least 100 sets of 770 data blocks, the CLK/N signal is slipped by one bit period. Therefore, considering that a defect in a communications system will produce a random number of bit errors over a large number of data blocks, the fact that the absence of bit errors is indistinguishable from an even number of bit errors per data block is not a significant problem.

Although the present invention has been described with respect to a particular embodiment, it is not to be so limited as changes and modifications may be made therein which are within the spirit and scope of the present invention. First, for example, the present invention may be used in any digital transmission system wherein the transmitted bit stream is partitioned into data blocks each having a given parity. This given parity may be odd, even or a combination thereof. Changing the parity to odd, or a combination of odd and even, merely changes the state of lead 109 from a constant state to a variable one which alternates between logic levels in a predetermined manner. The expected transitions, i.e., those in the absence of errors, could therefore be stored in the microprocessor and compared with those actually appearing on lead 109. Second, while in the disclosed embodiment the parity bit appears at the end of each data block, the position of the parity bit within the data blocks is arbitrary. Any predetermined position may be used. Thirdly, while a single parity bit per data block is disclosed, a plurality of parity bits per data block may be utilized without affecting circuit operation. Finally, while the operation of the disclosed embodiment has been described within a synchronous system transmitting contiguous data blocks, the present invention is also applicable to asynchronous systems wherein the data blocks can be separated from one another by arbitrary length idle periods. Within such an asynchronous system, signal CLK can be provided using well-known clocking circuitry.

What is claimed is:

1. Circuitry for detecting errors in a bit stream comprising data and parity bits arranged into a succession of data blocks wherein each block has a bit rate and a given parity, said circuitry comprising means for toggling between two states solely in response to the occurrence of a predetermined bit value in said bit stream, means for sampling the state of said toggle at a submultiple of said bit rate, and means for comparing said sampled states against a predetermined criterion.

2. The circuitry of claim 1 wherein said data blocks are contiguous and said given parity is even.

3. The circuitry of claim 1 wherein said submultiple of said bit rate is equal to said nominal bit rate divided by the number of bits in each of said data blocks.

4. The circuitry of claim 3 wherein each of said data blocks comprises 186 bits inclusive of one parity bit.

5. The circuitry of claim 1 wherein said comparing means inhibits said sampling means for one bit period if said predetermined criterion is not met.

6. The circuitry of claim 4 wherein said comparing means generates an error signal if said predetermined criterion is not met after inhibiting said sampling means by a number of bit periods not less than the number of bit periods in said data blocks.

7. The circuitry of claim 1 wherein each of said blocks comprises a parity bit in the last transmitted bit position.

8. Circuitry for detecting errors in a bit stream comprising a series of data blocks and wherein each data block further comprises at least one data bit and at least one parity bit, said circuitry comprising means for toggling between two states solely in response to a predetermined bit value in said bit stream, means for sampling a subset of toggle states occurring in response to each of said blocks, the size of said subset being equal to the number of parity bits in each block, and means for detecting changes in the subset sampled from block to block.

9. A method of detecting errors in a bit stream comprising data and parity bits arranged into a succession of data blocks wherein each block has a bit rate and a given parity, said method comprising the steps of toggling between two states solely in response to the occurrence of a predetermined bit value in said bit stream, sampling the state of said toggle at a submultiple of said bit rate, and comparing said sampled states against a predetermined criterion.

10. A method of detecting errors in a bit stream comprising a series of data blocks and wherein each data block further comprises at least one data bit and at least one parity bit, said method comprising the steps of toggling between two states solely in response to a predetermined bit value in said bit stream, sampling a subset of toggle states occurring in response to each of said blocks, the size of said subset being equal to the number of parity bits in each block, and detecting changes in the subset sampled from block to block.

* * * * *